May 21, 1935.  W. DYLEWSKI  2,002,086
AUTOMATIC BALL COCK VALVE
Filed July 29, 1932
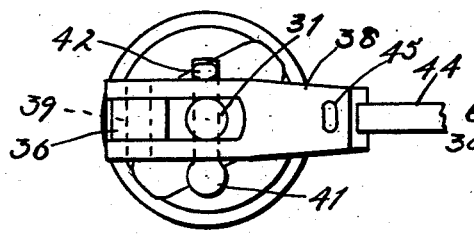
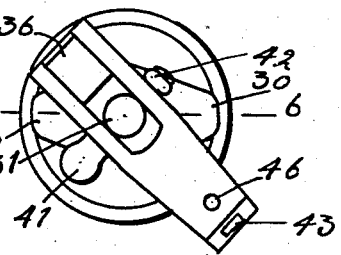
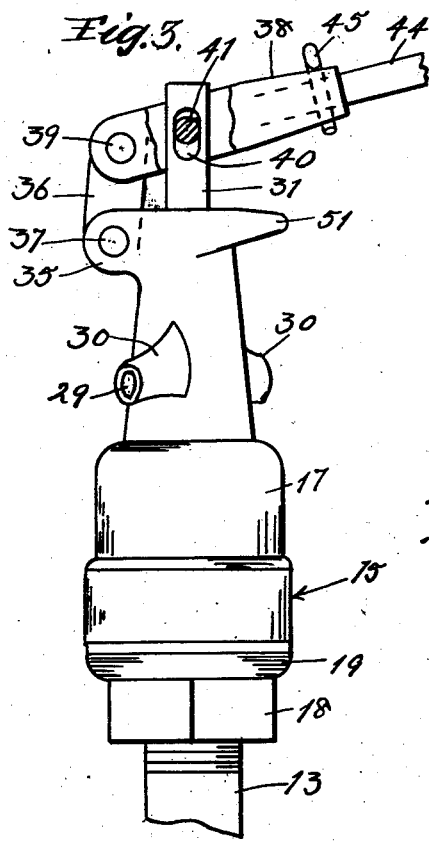
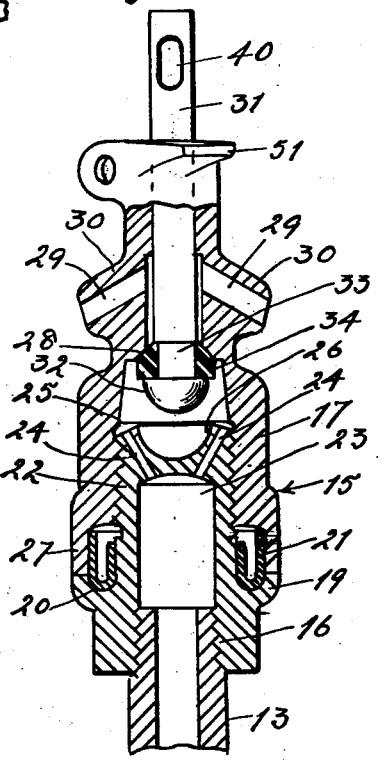
Inventor
Wladyslaw Dylewski
By W. W. Williamson
Atty.

Patented May 21, 1935

2,002,086

UNITED STATES PATENT OFFICE 2,002,086

AUTOMATIC BALL COCK VALVE

Wladyslaw Dylewski, Camden, N. J.

Application July 29, 1932, Serial No. 625,599

1 Claim. (Cl. 251—156)

My invention relates to new and useful improvements in an automatic ball cock valve, and has for one of its objects to provide an exceedingly simple and effective device of this character which will be automatically closed after an initial movement is imparted thereto by a float connected therewith.

Another object of the invention is to provide a valve structure wherein the valve plug will be automatically moved to its open position by a pressure of water after an initial opening movement has been imparted thereto by the weight of the float and component parts of said float and maintained in said open position by the pressure of the water until such time when the valve plug has been given an initial closing movement.

Another object of the invention is to provide a ball cock valve which may be closed and maintained in its closed position when there is no water in the flush tank providing the float is removed. This makes it possible to prevent the entrance of water into the flush tank without the necessity of turning off some outside valve.

Another object of the invention is to provide a valve of the kind mentioned wherein the parts may be readily disassembled, the washer or packing removed and replaced, and the parts of the valve reassembled easily, quickly and without the use of tools.

A still further object of the invention is to provide a valve casing of two parts, one having a valve seat and the other a valve rest, whereby the valve will be closed when the plug is moved in one direction and the operation of said valve plug restricted when moved in the opposite direction.

The ball cock valve consists principally of a casing having a valve seat therein with a slidably mounted valve plug and stem for cooperation with the seat, said stem being connected with a section of a weighted float stem in such manner that the valve plug and its stem will have a limited movement independent of the float stem, permitting the valve plug to be moved into its open and closed positions after being started.

With these and other ends in view, this invention consists in the details of construction and combination of elements hereinafter set forth and then specifically designated by the claim, In order that those skilled in the art to which this invention appertains may understand how to make and use the same, I will describe its construction in detail, referring by numerals to the accompanying drawing forming a part of this application, in which:—

Fig. 1 is a top plan or upper end view of an automatic ball cock valve constructed in accordance with my improvements with a portion of the float stem broken off.

Fig. 2 is a similar view in a slightly different position and with the float stem removed.

Fig. 3 is a side elevation of the device with a part of the socket element of the flat stem broken away to illustrate a detail of construction.

Fig. 4 is a section on the line 6—6 of Fig. 2, with the upper end of the body of the casing and the valve stem left in elevation.

15 represents a valve casing, preferably constructed in two parts, one of which will be known as the base 16 and the other, the body 17.

The base has a lower rectangular part 18 by which it may be engaged by a wrench or similar tool for mounting it upon a supply pipe and above the rectangular part is an annular flange 19 with a groove 20 in its upper face to receive the arcuate portion of a circular U-shaped packing 21 so that the free ends of the vertical walls extend upwardly leaving an entrance or mouth leading to the space between said walls, and preferably the outer wall is higher than the inner one as plainly shown in Fig. 4. An extension 22 projects above the flange 19 and is exteriorally threaded to receive the interiorally threaded part of the casing body 17.

The base 16 of the casing has a chamber or bore 23 formed in the lower end and said chamber is open at its lower end and provided with internal threads for connection with the pipe supply 13, while the upper end of said bore or chamber 23 is closed except for a number of holes 24 extending upwardly along radial lines or projecting outwardly obliquely from the top of the chamber 23 to the top of the extension 22 near its outer edge, thereby forming communications between said chamber 23 and the exterior of the extension 22 at the top thereof. If desirable, the exterior surface of the top of the extension may be beveled as indicated at 25 to which beveled portion the holes 24 will lead. In the outside of the top of the extension 22 is formed a cavity which acts as a rest 26 for the valve plug to be presently described.

The body of the valve casing includes a skirt 27 for enclosing the packing 21 and may and preferably does engage the flange 19. Above the skirt, the bore through the body of the casing is reduced and threaded throughout a portion of its length so that it may be screwed upon the extension of the base, and at the top of this reduced portion of the bore is formed the valve seat 28 and above said seat the bore is further reduced to provide a passageway around a valve stem which passageway leads to oppositely projecting downwardly extending outlet openings 29 formed in the nozzles 30 projecting in opposite directions from diametrically opposite sides of the casing body near its upper end.

Above the outlet openings 29, the bore through the casing body is further reduced in size to receive and act as a guide for the valve stem 31 which is slidably mounted and has a head 32 on its inner or lower end just back of which the stem is reduced to produce a neck 33 to receive the compressible valve plug or washer 34, and said head is of such size and shape as to fit within the rest 26 thus passing the valve plug or washer 34, so that streams of water issuing from the holes 24 will form eddies and produce a back pressure which will act upon the valve plug and maintain it in an open position after once being moved to such position or until such time as said plug is moved to a position that the pressure of the water may act upon the underside thereof.

At the upper end of the valve casing body are formed ears 35 between which is mounted one end of a link 36 and pivoted on the pin or axle 37 mounted in said ears. The other end of the link is pivoted between the jaws of the bifurcated end of the socket section 38 of the float stem on a pin or axle 39.

The upper end of the valve stem 31 projects into the space between the jaws of the bifurcated end of the float stem section 38 and has a longitudinal slot 40 for the passage of a pin 41 mounted in the socket section 38 and extending through the bifurcated end of the latter, and said pin 41 is held against accidental displacement by a key 42 passing through one end of the pin, it being understood that the opposite end has a head formed thereon. This arrangement connects the valve stem to the float stem with a certain amount of lost motion between them, whereby the two elements are permitted to operate under certain conditions independent of each other as will be hereinafter more fully described.

The outer or free end of the socket section 38 of the float stem is provided with a socket 43 for the reception of the rod section 44 of the float section, the latter being removably held in place by a cotter pin 45 or its equivalent, which passes through a hole 46 in the socket section 38 intersecting the socket 43 and also passing through a suitable hole in the rod section 44 when the latter is in place.

On the upper end of the casing body is formed a stop lug 51, positioned in the downward path of travel of the float stem, and more particularly the socket section thereof, so that if the water in the flush tank recedes to such an extent that the water level reaches a point lower than the float, then the float structure will be supported on the lug 51 due to contact of the socket section 38 with said lug.

Assuming that the ball cock valve is open due to withdrawal of the water from the flush tank, then the water under pressure will pass through the chamber or bore 23, the holes 24, thence through the bore of the casing body and finally out of the openings 29 in the nozzles 30.

The water entering the flush tank will gradually elevate the float until the pin 41 reaches the top of the slot 40 in the valve stem 31 and the continued upward movement of the float will gradually raise the valve plug through its stem until said valve plug reaches a position where the pressure of the water will act thereon and instantaneously force it against its seat so as to shut off the water supply. This final instantaneous movement of the valve plug is made possible by the loose connection between the valve stem and the float stem, and while the float stem will remain at the highest position, it can be carried by the rising water in the tank, the valve stem will move further until it assumes a position such as shown in Fig. 3.

Upon operation of the flush valve to draw the water from the tank, the water level will begin to recede permitting the float to descend so as to bring the pin 41 into engagement with the lower end of the slot 40 in the valve stem. The further recession of the water level will cause the weight of the float structure to be transferred to the valve stem so that the valve plug will be unseated, and after the water in the tank has reached its lowest level so that the flush valve is closed, said tank will begin to again fill and as the water level rises the ball cock valve will be again closed as above described.

By withdrawing the cotter pin 45 and removing the rod section of the float stem, the water may be withdrawn from the flush tank and the ball cock valve will not open to admit water to the tank. Of course it should also be obvious that if the ball cock valve is open and the float structure is removed, that said ball cock valve can be closed at any point by manually elevating the socket section 38 of the float stem.

In order to renew the washer or valve plug proper 34, the casing body 17 can be unscrewed from the casing base, the locking key 42 removed and the pin 41 withdrawn so that the valve plug structure can be removed through the inner or lower end of the casing body. The washer 34 can then be pulled over the head 32 and another or new one substituted therefor. Thereafter the parts can be replaced and reconnected. As the casing body is replaced upon the casing base with a packing positioned as shown in Fig. 4, any leakage past the threads between the casing body and base will build up a pressure in opposite directions against the walls of the packing, causing said walls to snugly fit the joint between said body and base and thus prevent any leakage even though there is not a tight joint between the threads or other coacting metallic parts.

Of course I do not wish to be limited to the exact details of construction as herein shown, as these may be varied within the limits of the appended claim without departing from the spirit of my invention.

Having thus fully described my invention, what I claim as new and useful is:—

In a ball cock valve, a base for connection to a water supply pipe, a central extension formed integral with said base and providing a chamber open at its lower end to receive the supply of water, said chamber being practically closed at its upper end by the top wall of said extension, said top wall having holes passing therethrough in divergent directions at the perimeter thereof, a rest formed in said top wall, a body having a passageway through it and mounted directly on the extension, a valve seat in said body in opposed spaced relation to the rest, and a valve within said body for coaction with said seat and rest without interfering with the passage of water through the holes.

WLADYSLAW DYLEWSKI.